UNITED STATES PATENT OFFICE

2,739,968

SUBSTITUTED PIPERIDINES

Nathan Sperber, Bloomfield, N. J., Frank J. Villani, Brooklyn, N. Y., and Domenick Papa, Bloomfield, N. J., assignors to Schering Corporation, Bloomfield, N. J., a corporation of New Jersey No Drawing. Application August 17, 1951,
Serial No. 242,438

10 Claims. (Cl. 260—293)

This invention relates to a new group of compounds of important physiological properties. More particularly, the invention relates to substituted piperidines having antihistaminic, antispasmodic, antiacetylcholine and analgesic activity, to intermediates for preparing them, and to methods of preparing them.

The substituted piperidines of this invention may be represented by the general formula

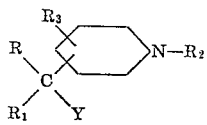

wherein R and $R_1$ are members of the group consisting of aryl, aralkyl, aralkenyl, cycloalkyl, cycloalkene, heterocyclic, alkyl and alkene groups, $R_2$ is selected from the group consisting of hydrogen, lower alkyl and aralkyl groups, $R_3$ is selected from the group consisting of hydrogen, chlorine, bromine, lower alkyl and lower alkoxy groups, and Y is hydrogen, hydroxyl, alkoxy or acyloxy or an additional bond to the piperidine ring. Representative of the groups R and $R_1$ are phenyl, benzyl, thienyl, pyridyl, pyrimidyl, thiazyl, furyl, cyclohexyl, cyclohexenyl, propyl, isopropyl, butyl and others of these general types as well as their chlorine, bromine, dialkylamino, lower alkoxy and lower alkyl substitution products. Of particular utility for medicinal purpose are the compounds of the general formula wherein Y is hydrogen or an additional bond to the piperidine ring. This invention also embraces the acid addition salts and the quaternary salts of the compounds of the general formula. In general, enhancement of the antiacetylcholine, ganglionic and parasympathetic blocking activities is achieved by forming the quaternary salts such as the methiodide, methochloride, methobromide, methosulfate, ethiodide, p-toluenesulfonate, etc., of the tertiary nitrogen atom. The quaternary salts of the piperidylidene compounds of the invention, for example, diphenyl-(N,N-dimethyl-4-piperidylidene)-methane methylsulfate, are particularly advantageous in the control of gastric secretion and gastric motility in ulcer patients. In addition to the quaternary salts, acid addition salts such as the hydrochloride, tartrate, maleate, citrate and salicylate of the piperidine compounds of the general formula, for example, phenyl-(n-propyl)-(N-methyl-4-piperidylidene)methane citrate, have also been found to be effective. The latter salts are particularly useful in those cases where solutions of the amines of the invention are to be used.

In general, the compounds of the present invention may be prepared by several methods. The most general procedure is that illustrated by the following series of equations for the specific compounds shown:

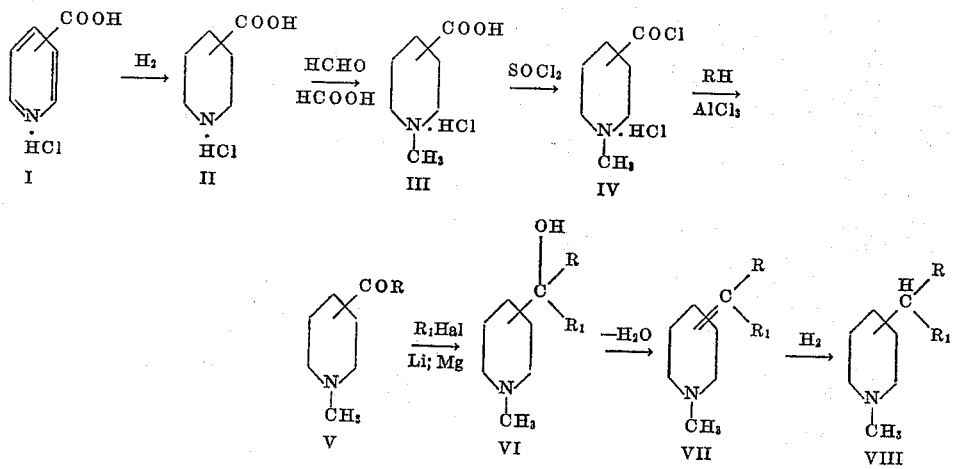

Pyridinecarboxylic acids such as picolinic acid, nicotinic acid, 6-methylnicotinic acid, etc., as such, or in the form of their hydrochlorides, are readily reducible to the corresponding piperidinecarboxylic acids. This reaction is carried out in a low pressure hydrogenator using platinum oxide catalyst or by high pressure hydrogenation using Raney nickel catalyst. Methylation of the piperidine compound proceeds smoothly by any of the known methods (for example, formic acid and formaldehyde) and subsequent treatment of the N-methyl compound with thionyl chloride gives the corresponding acid chloride. Reaction of the acid chloride by any of the usual Friedel-Crafts procedures with an aromatic compound, for example, benzene, thiophene, chlorobenzene, methoxybenzene, etc., yields the keto compounds of type V. Treatment of the latter substance with an organometallic derivative of a halogenated thiophene, pyridine, pyrimidine, thiazole, furan, cycloalkyl or alkyl compound yields the tertiary carbinols of formula VI. These substances are for the most part high-boiling liquids which can be readily recrystallized to white crystalline solid. Dehydration of the tertiary carbinols to the unsaturated compounds VII is carried out with agents such as thionyl chloride, phosphorous oxychloride, phosphorus tribromide, sulfuric acid, oxalic, acid, hydrochloric acid, etc. The choice of reagents and reaction conditions for obtaining the unsaturated compounds of formula VII is determined by the nature of the quantities R and $R_1$. The methane derivatives of type VIII are obtained by reduction of the unsaturated compounds VII by known methods for the hydrogenation of ethylene compounds. Unlike the tertiary carbinols, the methane compounds are found in both solid and liquid form and are lower-boiling than the tertiary alcohols.

With the exception of the alkyl and cycloalkyl types, the piperidine compounds VIII can be made by the following alternate method which employs as intermediate the pyridine derivatives IX. The latter compounds can be obtained from the corresponding carbinols (J. A. C. S. 70, 4001 (1948); J. A. C. S. 71, 887 (1949)) by replacement of the hydroxyl group by halogen (thionyl chloride) followed by reductive dehalogenation using zinc and acetic acid or any one of several catalytic procedures. The pyridine compound, on oxidation with potassium permanganate, yields the keto compounds X (J. A. C. S. 72, 2722 (1950)) which are then transformed into the tertiary carbinols XI by the same procedures used for the conversion of V to VI. High pressure catalytic hydrogenation of XI simultaneously reduces the pyridine ring, dehydrates the resulting piperidine carbinols (XII) and saturates the newly formed double bond of XIII to yield the methane derivative XIV. Alkylation of the piperidine compound XIV is carried out by any of the known methods, for example, formic acid and formaldehyde, alkyl halides with alkali, etc. Compounds of the type of XII and XIII may also be alkylated to compounds of the type of VI and VII, respectively, in the same manner.

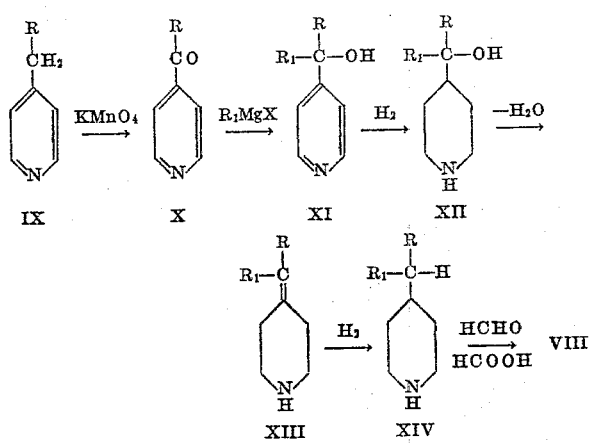

The following alternate synthesis also has been found to be generally applicable for the synthesis of compounds of the general formula. The reactions are illustrated by the following equations:

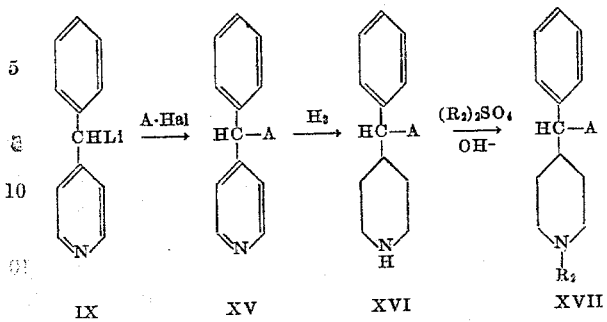

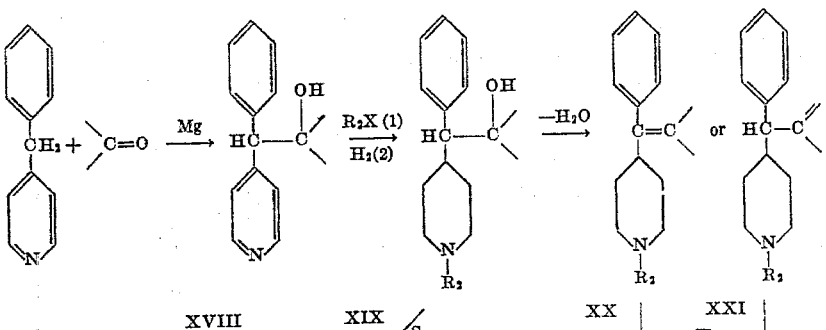

When $\diagdown \hspace{-0.5em}C=O \diagup$ is cyclohexanone

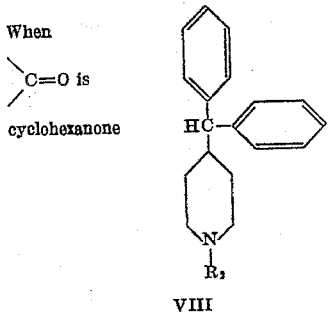

wherein A are the radicals of the quantity $R_1$, except phenyl. This procedure utilizes the known reactivity of the methylene hydrogens of the benzylpyridines. The hydrogens are capable of replacement by reactive metals such as sodium potassium, lithium and magnesium. The resulting metallic derivatives of the benzylpyridines undergo the normal condensation reactions with halides, carbonyl compounds, etc.

The reaction shown in the first of the above two equations illustrates the reaction of an aralkylpyridine, for example benzylpyridine, and an organolithium compound. Conversion of the resulting condensation product XV to the piperidino compounds of the general formula proceeds in known manner, i. e., reduction of the pyridine ring (XVI) and subsequent alkylation of the piperidino nitrogen (XVII). The latter two steps can be readily carried out in one operation by the high pressure reduction of the pyridine ring in the presence of methanol, ethanol and other alcohols to give the respective N-methyl, N-ethyl, etc., substituted piperidines.

The second equation illustrates the reaction of compounds of type IX with carbonyl compounds. For example, 4-benzylpyridine reacted with lithium or magnesium and then with cyclohexanone gives the tertiary alcohols XVIII, which can then be converted by successive alkylation and hydrogenation to the N-alkylpiperidino compounds XIX. The latter can be dehydrogenated, for example, by heating with sulfur to give the methane derivatives of type VIII. Dehydration of XIX yields the unsaturated compounds XX or XXI, or a mixture of both, which on hydrogenation likewise give the methane derivatives of type VIII.

Another approach to the compounds of the general formula is illustrated in the following equation:

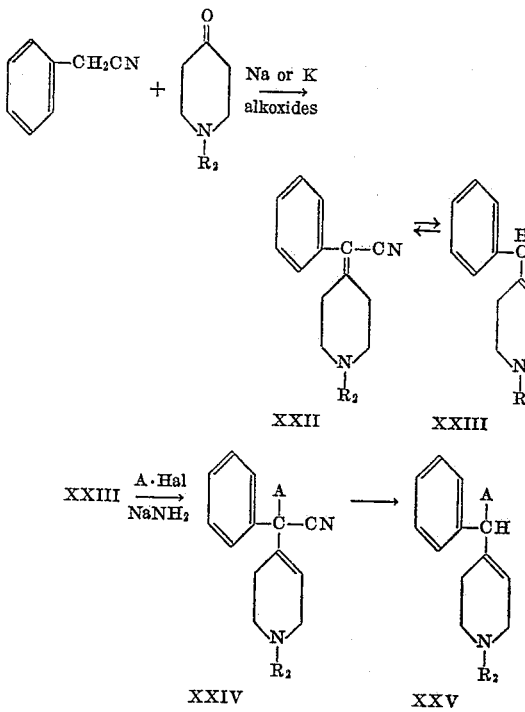

wherein A is as previously defined. The formation of XXII is carried out by forming the lithium derivative of phenylacetonitrile and reacting the resulting organometallic compound with N-alkyl-4-piperidone. The subsequent alkylation to XXIV proceeds through the unsaturated compound XXIII, which forms from XXII in the course of the reaction.

The hydrolysis of the nitriles and the decarboxylation of the resulting acids to the corresponding methane derivatives XXV can be effected, for example, by refluxing the nitriles with one mole of sodamide in toluene or xylene for about 20 to 24 hours.

In place of phenylacetonitrile, other acetonitriles can be used in this reaction provided the α-carbon is unsubstituted, for example, thienylacetonitrile, capronitrile, p-chlorophenylacetonitrile, furylacetonitrile, cyclohexylacetonitrile, pyrimidylacetonitrile, etc.

Using the N-alkylpiperidinecarboxylic acids III in the form of the ethyl or methyl esters in the conventional Grignard reaction with, e. g., an aryl, aralkyl, heterocyclic, cycloalkyl or alkyl magnesium halide, the compounds of the general formula are obtained wherein R and $R_1$ are the same. The reaction is illustrated by the following equation for the diphenyl compound from isonipecotic acid:

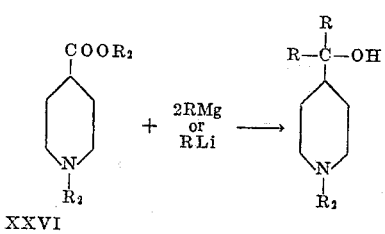

It is readily seen that this reaction yields the carbinols of type VI in one step from the ester of III. This method, as indicated, is, of necessity, limited to those compounds wherein R and $R_1$ are the same. However, in those cases, this procedure has considerable application in view of the number of Grignard reagents of R and $R_1$, which are readily available. In similar fashion, the corresponding 2- and 3-piperidinecarboxylic acid esters yield the 2- and 3-N-alkylpiperidine substituted carbinols.

The piperidyl carbinols of type VI can also be prepared by the reactions illustrated by the following equations.

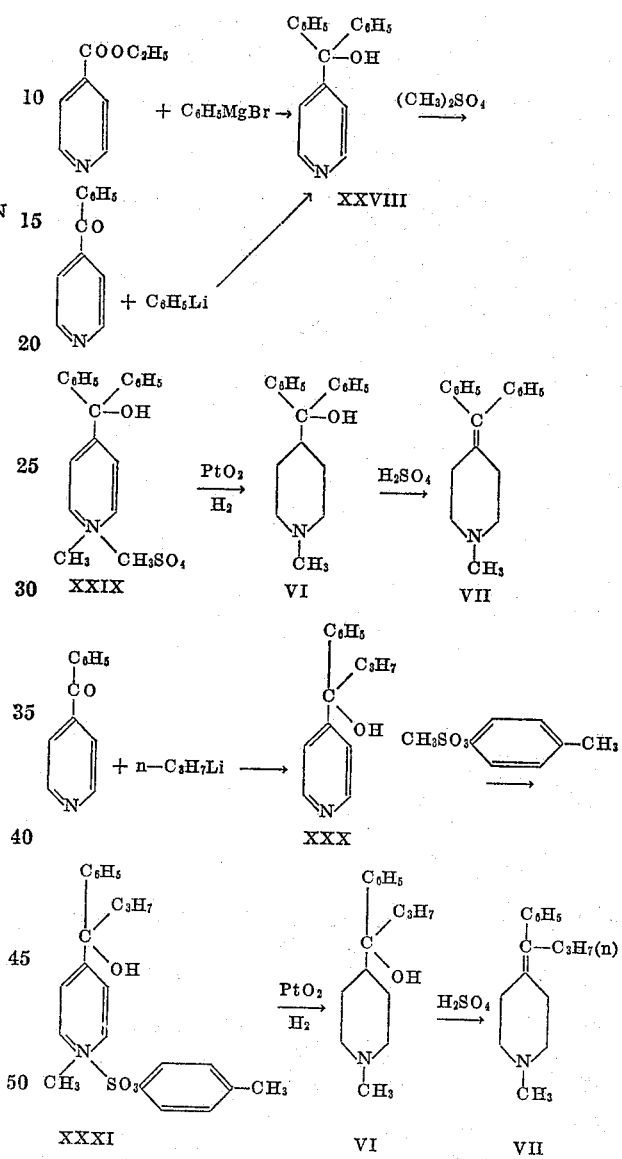

The invention will be further described by way of the following examples, which are, however, presented only by way of illustration and not as indicating the limitations of the invention.

EXAMPLE I

*Phenyl-(2-pyridyl)-(N-methyl-4-piperidyl)carbinol*

Isonipecotic acid hydrochloride: A mixture of 24.6 g. of isonicotinic acid, 100 cc. of water, 3–5 cc. concentrated hydrochloric acid and 1 g. of platinum oxide catalyst is shaken in a Parr apparatus at an initial pressure of about 60 lbs. Within several hours, the theoretical amount of hydrogen is absorbed, the catalyst is removed by filtration and the filtrate concentrated to dryness in vacuo. The solid residue melts at 293° C. with decomposition. The crude product may be purified by washing with cold, absolute ethanol.

The reduction also may be effected by dissolving isonicotinic acid in excess concentrated hydrochloric acid, evaporating the solution to dryness and reducing the hydrochloride salt in aqueous solution with platinum oxide catalyst.

N-methylisonipecotic acid hydrochloride: To 185 g. of 90% formic acid in a one liter flask cooled in an ice bath is added 109 g. of isonipecotic acid hydrochloride, followed by 165 cc. of 37% formalin solution. The mixture is heated and stirred overnight, the solution then concentrated to dryness in vacuo, leaving a slightly gummy, white residue. The latter is dried in a vacuum desiccator over phosphorus pentoxide and recrystallized from absolute ethanol, M. P. 225–226° C.

4-benzoyl-N-methylpiperidine: To 17.5 g. of N-methylisonipecotic acid hydrochloride, in a 500 cc., three-necked flask fitted with a stirrer, dropping funnel and reflux condenser, is added dropwise 125 cc. of thionyl chloride. The mixture is refluxed and stirred for two hours and the excess thionyl chloride removed in vacuo. The flask is then cooled in an ice-salt bath and 140 cc. of dry benzene added. To the stirred mixture, 77 g. of anhydrous aluminum chloride is added during 30 minutes. The reaction mixture is allowed to warm to room temperature, stirred, and refluxed for 18 hours and poured on ice-hydrochloric acid. The benzene layer is extracted with 15% hydrochloric acid and the aqueous acid layers made alkaline with 50% sodium hydroxide solution. The oil which separated is extracted with chloroform, the chloroform extracts dried over sodium sulfate, filtered; and, after removing the solvent, the residue is fractionated, B. P. 122–125° C./0.5–1 mm.

A solution of butyllithium is prepared in ether at −10° C. by reacting 1 g. of lithium, 100 cc. of anhydrous ether and 9.6 g. of dry butylbromide in a nitrogen atmosphere according to the directions of Gilman et al., J. A. C. S. 71, (1949). The solution of butyllithium is cooled to −40° C. and 11.06 g. of 2-bromopyridine is added dropwise with stirring and the solution stirred for 30 minutes. Then 10.2 g. of 4-benzoyl-N-methylpiperidine in 50 cc. of ether is added dropwise and the reaction mixture allowed to warm to room temperature slowly and then stirred for an additional seven hours. The mixture is poured on ice and hydrochloric acid, the aqueous phase separated and then made alkaline. The base is taken up in ether and the ether extracts dried. After removal of the solvent, a white solid remains. Recrystallized from benzene, M. P. 122–123° C. Recrystallization from n-hexane raises the melting point to 125° C.

EXAMPLE II

*Phenyl-(2-pyridyl)-(N-methyl-4-piperidylidene)methane*

A mixture of 11 g. of phenyl-(2-pyridyl)-(N-methyl-4-piperidyl)carbinol and 70 cc. of thionyl chloride is refluxed on the steam bath for two–ten hours. The excess thionyl chloride is removed in vacuo, 20 cc. of dry benzene added and the solvent distilled in vacuo to remove traces of thionyl chloride. To the oily residue is added slowly, with cooling, excess 25% sodium hydroxide solution. The product is then warmed on the steam bath with stirring for one hour and the oil taken up in benzene, dried, treated with activated carbon, filtered and concentrated to dryness.

Alternatively, a mixture of one part of the piperidyl carbinol and six parts of 85% sulfuric acid is heated at 170° C. for 30 minutes. The solution is poured on cracked ice, made basic with dilute sodium hydroxide and the oily layer extracted with ether. The ether extracts are washed, dried, and after removing the solvent, the residue is distilled in vacuo.

EXAMPLE III

*(p-Chlorophenyl)-(2-pyridyl)-(N-methyl-4-piperidyl)carbinol*

4-(p-chlorobenzoyl)-N-methylpiperidine: Twenty-five grams of N-methylisonipecotic acid is converted to the acid chloride and reacted with 394 g. of chlorobenzene and 114 g. of anhydrous aluminum chloride as in Example I. The excess chlorobenzene is removed by steam distillation and the acidic residue extracted with chloroform and the solvent removed by distillation. The residue solidifies and is triturated with cold petroleum ether, M. P. 118–119° C. Recrystallized from n-hexane, M. P. 124° C.

Conversion to the carbinol is carried out as described for the corresponding phenyl compound of Example I. The product is obtained as a viscous yellow oil, B. P. 223–225° C. (5 mm.).

EXAMPLE IV

*(p-Chlorophenyl)-(2-pyridyl)-(N-methyl-4-piperidylidene)methane*

The carbinol of Example III is treated with thionyl chloride according to the directions of Example II. The chloro compound is a viscous, yellow liquid.

EXAMPLE V

*Diphenyl-(N-methyl-4-piperidyl)carbinol*

To a Grignard solution prepared from 4.9 g. of magnesium, 100 cc. of ether and 31.4 g. of dry bromobenzene is added 18.5 g. of 4-benzoyl-N-methylpiperidine in 200 cc. of dry ether. The reaction mixture is heated with stirring for four hours on the steam bath and then decomposed. The organic layer is separated and the aqueous layer extracted with benzene. The combined organic extracts are concentrated and the residue, diphenyl-(N-methyl-4-piperidyl)carbinol, recrystallized from benzene-petroleum ether, M. P. 130–131° C. The Grignard complex may also be decomposed with ice and hydrochloric acid and the insoluble hydrochloride of the carbinol isolated directly.

EXAMPLE VI

*Diphenyl-(N-methyl-4-piperdiylidene)methane*

The carbinol of Example V is converted to the unsaturated compound as described in Example II. Alternatively, the carbinol can be dehydrated with 60% sulfuric acid. In general, to one part of the carbinol there is added 10 parts of 60% sulfuric acid. The mixture after heating for six hours is poured onto cracked ice, solution made alkaline with dilute sodium hydroxide and the oily basic layer extracted with ether. The ether extracts after washing with water are dried over sodium sulfate, and after removing the ether, the residue is distilled in vacuo, M. P. 52–53° C.

Alternatively, a solution of 40 g. of (4-pyridyl)-diphenylcarbinol (prepared as shown in the equation in column 6) in 100 ml. of dimethyl sulfate is heated on the steam bath for one hour. The dark brown solution is diluted with 500 cc. of benzene and the lower dark brown oily layer is separated and dissolved in 150 cc. of absolute ethanol. The resulting solution is reduced at 50 lbs. hydrogen pressure with 1.5 g. of platinum oxide catalyst until the theoretical amount of hydrogen is absorbed. The catalyst is filtered off, the filtrate concentrated and the residue dissolved in 300 ml. of water. Addition of dilute sodium hydroxide gives a viscous dark oil which is extracted with benzene and after removal of the benzene in vacuo, the residue is dissolved in 300 cc. of 60% sulfuric acid. The resulting acid solution is heated for six hours on the steam bath and poured onto a mixture of ice and water. The resulting aqueous solution is made alkaline with sodium hydroxide. The liberated oil is extracted with ether and after drying the ether solution and removing the ether, the residue is distilled. The product (N-methyl-4-piperidylidene)-1,1-diphenylmethane obtained is identical with that secured by the foregoing procedure.

In place of dimethyl sulfate, the pyridyl carbinol can be quaternized with methyl iodide, methyl bromide, methyl chloride, methyl-p-toluene sulfonate and other similar reagents. In place of platinum oxide catalyst there can be used Raney nickel at slightly higher pressures, palladium on carbon, platinum black and other similar catalytic materials.

EXAMPLE VII

*(p-Chlorophenyl)-phenyl-(N-methyl-4-piperidyl)-carbinol*

This carbinol is prepared by reaction of 4-(p-chlorobenzoyl)-N-methylpiperidine with phenylmagnesium bromide as in Example V. M. P. 142° C. from n-hexane.

EXAMPLE VIII

*(p - Chlorophenyl) - phenyl - (N - methyl - 4 - piperidylidene)methane*

The carbinol of Example VII is converted to the unsaturated derivative via the procedures of Example VI. This derivative is a viscous, yellow liquid, B. P. 155–156° C. (6 mm.).

EXAMPLE IX

*Phenyl - (2 - pyridyl) - (N - methyl - 4 - piperidyl) - carbinol hydrochloride*

The hydrochloride is prepared in the conventional manner from the carbinol of Example I and anhydrous hydrogen chloride in absolute ether. The melting point of the crude hydrochloride is 85–90° C. It may be purified by recrystallization from a mixture of absolute alcohol and ether.

EXAMPLE X

*Phenyl - (2 - pyridyl) - (N - methyl - 4 - piperidyl) - carbinol methiodide*

This quaternary salt is prepared from the carbinol of Example I and methyl iodide in the usual manner. The methiodide is a white, crystalline compound melting at 223.5–224.5° C.

EXAMPLE XI

*Phenyl - (2 - pyridyl) - (N - methyl - 4 - piperidylidene) - methane methiodide*

This salt is prepared from the methane derivative of Example II and methyl iodide.

EXAMPLE XII

*Diphenyl - (N - methyl - 4 - piperidyl)carbinol hydrochloride*

This hydrochloride is prepared in the conventional manner from the carbinol of Example V and anhydrous hydrogen chloride. The crude hydrochloride melts at 252° C. and after several recrystallizations from absolute alcohol and ether mixture, an analytically pure sample melts at 290° C.

EXAMPLE XIII

*Diphenyl - (N - methyl - 4 - piperidylidene)methane methiodide*

This salt is prepared from the tertiary amine of Example VI and methyl iodide, M. P. 260–261° C.

EXAMPLE XIV

*(p - Methoxyphenyl) - (2 - pyridyl) - (N - methyl - 4 - piperidyl)carbinol*

The compound of this example is prepared as described for the unsubstituted compound of Example I, except that anisole is used in place of the benzene in the Friedel-Crafts reaction. The 4-(p-methoxybenzoyl)-N-methylpiperidene is obtained as a pale yellow liquid boiling at 136–139° C. (2 mm.). Reaction of this ketonic material with 2-pyridyllithium proceeds as described for the unsubstituted compound.

EXAMPLE XV

*(p - Methoxyphenyl) - (2 - pyridyl) - (N - methyl - 4 - piperidylidene)methane*

Conversion of the carbinol of Example XIV to the unsaturated derivative is readily accomplished by the procedure of Example II.

EXAMPLE XVI

*Phenyl - (p - methoxyphenyl) - (N - methyl - 4 - piperidyl)carbinol*

This compound is prepared in accordance with the procedure of Example I substituting p-methoxybromobenzene for the 2-bromopyridine in the lithium reaction. B. P. 202–209° C. (2 mm.); M. P. 128–129° C.

EXAMPLE XVII

*Phenyl - (p - methoxyphenyl) - (N - methyl - 4 - piperidylidene)methane*

This compound is prepared from the carbinol of Example XVI by the procedure of Example II.

EXAMPLE XVIII

*Diphenyl - (N - methyl - 4 - piperidylidene)methane methochloride*

From the methiodide of Example XIII with silver chloride in methanol, M. P. 182° C. The hydrate of the methochloride melts at 221–222° C.

EXAMPLE XIX

*Phenyl - (1 - hydroxycyclohexyl) - (N - methyl - 4 - piperidyl)methane*

The intermediate phenyl-(1-hydroxycyclohexyl)-(4-pyridyl)methane is prepared as follows: To a solution of 0.5 mole of phenyllithium in 500 ml. of ether (prepared from 1 gram of lithium and 0.5 mole of bromobenzene) is added 0.5 mole of 4-benzylpyridine. The mixture is stirred at room temperature for one hour then cooled in an ice-salt bath. A solution of 0.5 mole of dry cyclohexanone is added dropwise and after stirring for several hours at room temperature, the mixture is decomposed with ice and hydrochloric acid. The acid solution is made basic with 25% sodium hydroxide and the carbinol is obtained.

The carbinol is converted to the corresponding ethiodide or methiodide and reduced with $PtO_2$ catalyst and hydrogen in absolute methanol. The theoretical amount of hydrogen is absorbed and upon removal of the solvent, the hydrogen iodide salt of the desired base is obtained. Treatment of the salt with sodium hydroxide liberates the free base. The latter can be readily converted to any desired quaternary salt using the appropriate alkyl halide or other suitable substance. It is thus possible to prepare the methiodide, the ethiodide, the methosulfate, the ethosulfate, etc.

The reduction and alkylation of the piperidine nitrogen may also be effected in two steps. The carbinol is reduced with $PtO_2$ and hydrogen in acetic acid and the resulting phenyl - (1 - hydroxycyclohexyl)-(4-piperidyl)-methane alkylated with methyl iodide in alkaline solution or with formic acid and formaldehyde, to give the N-methyl compound of this example.

EXAMPLE XX

*Phenyl - cyclohexyl - (N - methyl - 4 - piperidyl)methane*

The intermediate, phenyl-cyclohexyl-(4-pyridyl)methane is prepared as follows: To a stirred solution of potassium amide (from 21 g. of potassium) in 1.5 l. of liquid ammonia is added 91 g. of 4-benzylpyridine. After 15 minutes, 88 g. of cyclohexyl bromide is added, followed by one liter of dry ether. The reaction mixture is stirred for four hours and then decomposed with water. The ether layer is washed with water, dried, the solvent removed and the residual oil distilled, B. P. 168–175° C. (1 mm.), M. P. 84–85° C. (from petroleum ether).

Phenyl-cyclohexyl-(4-pyridyl)methane is converted to the corresponding methiodide by reacting the free base with an excess of methyl iodide. The methiodide is recrystallized from methanol-ether, M. P. 214–215° C.

The methiodide is dissolved in methyl alcohol and reduced with platinum oxide and hydrogen at room temperature and a pressure of sixty pounds. After the theoretical amount of hydrogen is absorbed, the catalyst is filtered, washed with methanol and the combined filtrates concentrated in vacuo to dryness. The hydriodic acid salt of phenyl-cyclohexyl-(N-methyl-4-piperidyl)-methane melts at 186–187° C. (from methanol-ether). Upon treatment with sodium hydroxide solution, the free base is obtained, B. P. 156–160° C. (1.5 mm.).

EXAMPLE XXI

*Phenyl-cyclohexyl-(4-piperidyl)methane*

To a solution of 20 g. of phenyl-cyclohexyl-(4-pyridyl)methane in 500 cc. of absolute ethanol there is added 50 g. of sodium metal. After completion of the reaction, the ethanol is removed in vacuo, the oil extracted, dried and the solvent removed. The residual oil boils at 155–162° C. at 1.5 mm.

Upon methylation with formic acid and formaldehyde in the usual manner, phenyl-cyclohexyl-(N-methyl-4-piperidyl)methane is obtained identical with that of Example XX.

EXAMPLE XXII

*Diphenyl-(N-methyl-4-piperidyl)methane*

The requisite carbinol, diphenyl-(4-pyridyl)carbinol is prepared in the following manner: To a solution of phenyllithium (from 4.8 g. of lithium and 54 g. of bromobenzene) in 250 cc. of ether, is added 55 g. of 4-benzoylpyridine in 150 cc. of ether, keeping the temperature between 10–20° C. After stirring at room temperature for ten hours, the reaction is decomposed with 10% hydrochloric acid, the acid layer separated, made basic with dilute sodium hydroxide, and the solid filtered, M. P. 231–232° C. from ethanol-water. The above carbinol is reduced in methanol with Raney nickel and hydrogen at 160–170° C. for eleven hours at a pressure of 1500 lbs. per square inch to give diphenyl-(N-methyl-4-piperidyl)methane, M. P. 88–89° C. after recrystallization from petroleum ether.

EXAMPLE XXIII

*Diphenyl-(N-methyl-4-piperidyl)methane methiodide*

The methiodide of diphenyl-(N-methyl-4-piperidyl)-methane is readily prepared by treating the free base with an excess of methyl iodide. Upon recrystallization from methanol-ether, the methiodide melts at 257–258° C.

EXAMPLE XXIV

*Diphenyl-(N-methyl-4-piperidyl)methane*

Diphenyl-(N-methyl-4-piperidylidene)methane of Example VI is dissolved in absolute ethanol and reduced with Raney nickel and hydrogen at a temperature of 75–80° C. and a pressure of 1600 lbs. per square inch. After seven hours, the catalyst is filtered, washed with ethanol and the combined filtrate and washings concentrated in vacuo to a crystalline residue. The latter is recrystallized from petroleum ether and melts at 89–90° C., identical with the product obtained by the methods of Example XXII.

EXAMPLE XXV

*Diphenyl-(N-methyl-3-piperidyl)carbinol*

Diphenyl-(N-methyl-3-piperidyl)carbinol is prepared in the following manner: To a solution of phenylmagnesium bromide (prepared from 10.1 g. of magnesium and 66 g. of bromobenzene) in 100 cc. of ether, is added 22 g. of methyl-N-methyl nipecotate in 100 cc. of toluene. After heating for two hours on the steam bath, the reaction mixture is poured onto ice and dilute hydrochloric acid. The white solid is filtered and dissolved in hot water. The resulting solution is made basic with dilute sodium hydroxide, the liberated oil is extracted with chloroform, the chloroform layer is dried and concentrated. The residual oil solidifies upon cooling and after recrystallization from ethanol and water, the carbinol melts at 147–148° C.

EXAMPLE XXVI

*Diphenyl-(N-methyl-3-piperidylidene)methane*

The carbinol of Example XXV is dehydrated in the same manner as in Example II giving a yellow oil boiling at 135–138° C./0.5 mm.

EXAMPLE XXVII

*Phenyl-(2-thiazyl)-(N-methyl-4-piperidyl)methane*

The intermediate, phenyl-(2-thiazyl)-(4-pyridyl)methane, is prepared as follows: To a stirred solution of potassium amide (from 0.11 mole of potassium metal) in 250 ml. of liquid ammonia is added 0.1 mole of 4-benzylpyridine. After 15 mins., 0.1 mole of 2-bromothiazole is added slowly and the mixture stirred an additional hour. Ether (250 cc.) is added to the reaction mixture and the latter is stirred overnight at room temperature. Water is added and the organic layer is separated, washed with water, dried and the solvent removed. Upon distillation in vacuo, phenyl-(2-thiazyl)-(4-pyridyl)methane is obtained as a viscous oil.

A solution of 0.1 mole of this pyridyl compound in acetic acid is reduced catalytically with $PtO_2$ and hydrogen to the corresponding piperidine derivative. Methylation with formic acid and formaldehyde yields the desired phenyl-(2-thiazyl)-(N-methyl-4-piperidyl)methane.

EXAMPLE XXVIII

*Phenyl-Δ'-cyclohexenyl-(N-methyl-4-piperidyl)methane*

The phenyl-(1-hydroxycyclohexyl)-(N-methyl-4-piperidyl)methane of Example XIX is heated on the steam bath with 80% sulfuric acid for several hours. After neutralization of the cooled acid solution with gaseous ammonia, the unsaturated piperidine compound is extracted with ether. The ether extract is washed with sodium carbonate solution, water, dried and concentrated in vacuo. The residual oil is distilled, B. P. 122–127° C./4–5 mm.

The dehydration can be effected with oxalic acid, potassium bisulfate, acetic anhydride-sulfuric acid, acetic and hydrochloric acid, acetic acid-sulfuric, and $P_2O_5$, phosphorous oxychloride, thionyl chloride-pyridine, p-toluene-sulfonic acid and similar dehydrating agents.

Reduction with $PtO_2$ and hydrogen in methanol or acetic acid removes the double bond to give the phenyl-Δ'-cyclohexenyl-(N-methyl-4-piperidyl)methane of Example XX.

EXAMPLE XXIX

*Phenyl-cyclohexyl-(N-methyl-4-piperidyl)methane*

The cyclohexene derivative of Example XXVIII is reduced in methanol solution with Raney nickel and hydrogen at 50–60° C. at an initial pressure of about 1000 lbs. per square inch. The catalyst is then filtered and the alcohol solution evaporated. The oily residue is distilled.

EXAMPLE XXX

*1,2-diphenyl-1-(N-methyl-4-piperidylidene)ethane*

To a stirred suspension of 0.1 mole of sodium amide in 300 ml. of toluene is added 0.1 mole of phenyl-(N-methyl-4-piperidylidene)acetonitrile dropwise with stirring. The reaction mixture is heated on the steam bath for one hour and 0.1 mole of benzyl chloride is added slowly. After refluxing and stirring for eight hours, the reaction mixture is decomposed with water, the organic layer is separated and the solvent is removed. Distillation in vacuo yields benzyl-phenyl-(N-methyl-4-piperidylidene)acetonitrile.

A mixture of 0.1 mole of the nitrile and 0.15 mole of sodamide in 250 ml. of xylene is refluxed for thirty hours. The reaction mixture is cooled, decomposed with water and the xylene concentrated in vacuo to a residue. Upon distillation of the latter in vacuo, the desired 1,2-diphenyl-1-(N-methyl-4-piperidylidene)ethane is obtained.

EXAMPLE XXXI

*Diphenyl-(N-ethyl-4-piperidylidene)methane*

This compound is prepared either from methyl-N-ethylisonipecotate (B. P. 103–110° C./20 mm.) or from ethyl-N-ethylisonipecotate (B. P. 121–125° C./20 mm.) by the procedure of Examples XXV and XXVI. The base after isolation is distilled in vacuo, B. P. 150–155° C./1 mm.

EXAMPLE XXXII

*Diphenyl-(N-ethyl-4-piperidylidene)methane ethiodide*

This quaternary salt is prepared from the tertiary base of Example XXXI by reaction of ethyl iodide; M. P. 263–264° C. after recrystallization from ethanol.

EXAMPLE XXXIII

*Diphenyl-(N-ethyl-4-piperidylidene)methane ethbromide*

This quaternary salt is prepared from the tertiary base of Example XXXI by reaction with ethyl bromide, M. P. 232–233° C.

EXAMPLE XXXIV

*Diphenyl-(N-methyl-3-piperidylidene)methane methiodide*

This quaternary salt is prepared from the free base of Example XXVI and methyl iodide, M. P. 217–218° C.

EXAMPLE XXXV

*Diphenyl-(N-methyl-3-piperidyl)carbinol methiodide*

This salt is prepared from the carbinol of Example XXV with methyl iodide, M. P. 263–264° C.

EXAMPLE XXXVI

*Diphenyl-(N-methyl-4-piperidyl)carbinol methiodide*

This salt is prepared from the free base of Example V and methyl iodide, M. P. 266–267° C.

EXAMPLE XXXVII

*Diphenyl - (N - methyl - 4 - piperidylidene)methane ethbromide*

This salt is prepared from the free base of Example VI and ethyl bromide, M. P. 204–205° C.

EXAMPLE XXXVIII

*Diphenyl-(N-methyl-4-piperidylidene)methane ethchloride*

This salt is prepared from the free base of Example VI and ethyl chloride, M. P. 140–141° C.

EXAMPLE XXXIX

*Diphenyl-(N-methyl-4-piperidylidene)methane ethiodide*

This salt is prepared from the free base of Example VI and ethyl iodide, M. P. 255° C.

EXAMPLE XL

*Diphenyl(N-methyl-4-piperidylene)methane methbromide*

This salt is prepared from the free base of Example VI and methyl bromide, M. P. 247° C.

EXAMPLE XLI

*Phenyl-cyclohexyl-(N-methyl-4-piperidyl)methane methiodide*

This salt is prepared from the free base of Example XX and methyl iodide, M. P. 208–209° C.

EXAMPLE XLII

*Phenyl-cyclohexyl-(N-methyl-4-piperidyl)carbinol*

To a solution of cyclohexyl magnesium chloride (32 g. of chlorcyclohexane and 6.5 g. magnesium) in 500 cc. of ethyl ether, there is added 27 g. of N-methyl-4-benzoyl-piperidine. Following the addition, the mixture is refluxed on the steam bath for four hours and after standing overnight is decomposed by pouring into a mixture of ice and hydrochloric acid. The tertiary base which separates is obtained in the form of the hydrochloride and in this crude state the hydrochloride melts at 203–205° C. The crude hydrochloride is dissolved in water, the solution made alkaline with 50% NaOH and the oil which separates is extracted with ether. The ether extracts are evaporated and the residue is crystallized from n-hexane or benzene, M. P. 144–145° C.

EXAMPLE XLIII

*Phenyl-cyclohexyl-(N-methyl-4-piperidyl)carbinol methiodide*

This salt is prepared from the free base of the previous example and methyl iodide, M. P. 254.5–255° C.

EXAMPLE XLIV

*Phenyl-(2-thienyl)-(N-methyl-4-piperidyl)carbinol*

This carbinol is prepared from 4-benzoyl-N-methyl-piperidine and 2-bromothiophene. M. P. 141–142° C. after recrystallization from ethyl alcohol.

EXAMPLE XLV

*Phenyl-(2-thienyl)-(N-methyl-4-piperidylidene)methane*

This compound is prepared from the carbinol of the preceding example by dehydration with thionyl chloride, B. P. 153–157° C./1 mm.

EXAMPLE XLVI

*Phenyl-(2-thienyl)-(N-methyl-4-piperidyl)-methane*

This compound is prepared from the unsaturated compound of the previous example by reduction with palladium on charcoal catalyst in ethanol.

EXAMPLE XLVII

*Phenyl-(2-thienyl)-(N-methyl-4-piperidyl)carbinol hydrochloride*

This compound is prepared from the carbinol of Example XLIV and anhydrous hydrogen chloride, M. P. 238–239° C.

EXAMPLE XLVIII

*Phenyl - (2 - thienyl) - (N - methyl - 4 - piperidylidene) methane ethiodide*

This quaternary salt is prepared from the unsaturated compound of Example XLV and ethyl iodide, M. P. 255–256° C.

EXAMPLE XLIX

*Di-(2-thienyl)-(N-ethyl-4-piperidyl)carbinol*

This carbinol is prepared from the ethyl ester of N-ethyl-isonipecotic acid and 2-thienyl magnesium bromide in accordance with the procedure of the preceding examples. The compound is obtained as a white crystalline solid which on recrystallization from ethanol melts at 120–121° C.

EXAMPLE L

*Phenyl-benzyl-(N-methyl-4-piperidyl)carbinol*

This carbinol is prepared from N-methyl-4-benzoyl piperidine and benzyl magnesium chloride in the conventional Grignard reaction. The carbinol is obtained as a white crystalline solid melting at 116–117° C.

EXAMPLE LI

*Phenyl-benzyl-(N-methyl-4-piperidyl)carbinol hydrochloride*

This compound is prepared from the carbinol of the previous example and anhydrous hydrogen chloride, M. P. 244–245° C.

EXAMPLE LII

*Phenyl-benzyl-(N-methyl-4-piperidylidene)methane*

This compound is prepared from the carbinol of Example L by treatment with thionyl chloride, B. P. 162–166° C./0.5 mm.

EXAMPLE LIII

*Phenyl-benzyl-(N-methyl-4-piperidylidene)methane methiodide*

This compound is prepared from the unsaturated compound of Example LII and methyl iodide, the quaternary compound of this example is obtained as a white to pale yellow crystalline solid, M. P. 263–264° C.

EXAMPLE LIV

*Phenyl-(n-propyl)-(N-methyl-4-piperidyl)carbinol*

This compound is prepared from 4-benzoyl-N-methylpiperidine and propyl magnesium bromide in accordance with the conventional Grignard procedure. The compound is a free-flowing pale yellow liquid boiling at 137–143° C./1 mm.

Alternatively, to a suspension of 7 g. of lithium shot in 200 cc. of anhydrous ether there is added 62 g. of n-propyl bromide. Throughout this reaction, an atmosphere of nitrogen is maintained and the temperature is kept between 0 and 10° C. After all the lithium has reacted, the solution is cooled to —40° C. and 50 g. of 4-benzoylpyridine in 300 cc. of ether is added dropwise. After the addition, the reaction mixture is stirred for three hours at room temperature and then decomposed with a dilute solution of ammonium chloride. The ether layer is separated, dried and, after removing the ether, the residue is distilled giving the compound phenyl-(n-propyl)-(4-pyridyl)carbinol, B. P. 165–175° C. (2 mm.).

This carbinol is dissolved in 300 cc. of xylene and after the addition of 40 g. of methyl-p-toluenesulfonate, the mixture is refluxed for one-half hour. After cooling, the lower yellow oily layer is separated, dissolved in 150 cc. of absolute alcohol and reduced as described in Example VI. Dehydration of the crude phenyl-(n-propyl)-(N-methylpiperidyl)carbinol is carried out with 40% sulfuric acid for four hours on the steam bath.

EXAMPLE LV

*Phenyl-(n-propyl)-(N-methyl-4-piperidyl)carbinol ethiodide*

This compound is prepared from the carbinol of the preceding example and ethyl iodide, M. P. 197–198° C.

EXAMPLE LVI

*Phenyl-(n-propyl)-(N-methyl-4-piperidylidene)methane*

This unsaturated compound is prepared from the carbinol of Example LV by treatment with a mixture of acetic anhydride and sulfuric acid. This substance is a colorless to pale yellow liquid boiling at 117–119° C./2 mm. This compound could also be the isomeric form, 1-phenyl-1-(N-methyl-4-piperidyl)butene-1.

EXAMPLE LVII

*Phenyl-isopropyl-(N-methyl-4-piperidyl)carbinol*

This compound is prepared as described for the compound of Example LIV using isopropyl magnesium bromide, B. P. 130–135° C./1-2 mm.

EXAMPLE LVIII

*Phenyl-isopropyl-(N-methyl-4-piperidylidene)methane*

This compound is prepared from the carbinol of the previous example by the procedure of Example LVI, B. P. 110–115° C./3-4 mm.

EXAMPLE LIX

*2,4-dimethyl-3-(N-methyl-4-piperidyl)pentanol-3*

This carbinol is prepared from methyl-N-methylisonipecotate and isopropyl magnesium bromide, B. P. 130–135° C./6-7 mm.

EXAMPLE LX

*Phenyl-(2-pyridyl)-(N-methyl-4-piperidyl)methane*

A mixture of 11 g. of the carbinol of Example I is slowly added to an ice cold mixture of 100 cc. of anhydrous benzene and 12 g. of thionyl chloride. The mixture is stirred for a few hours at or below 10° C. and dilute sodium hydroxide then added dropwise keeping the temperature below 20° C. When the mixture is alkaline, the benzene layer is separated, dried and concentrated. The resulting dark brown oil is dissolved in 150 cc. of glacial acetic acid, 20 g. of zinc dust added and the mixture then heated with stirring on the steam bath for four hours. The zinc salts are filtered, the filtrate made alkaline with dilute sodium hydroxide and then extracted with ether. The ether layer is dried and concentrated and the resulting residue which solidifies on cooling is recrystallized with petroleum ether, M. P. 92–93° C.

EXAMPLE LXI

*(p-Chlorophenyl)-(2-pyridyl)-(N-methyl-4-piperidyl)-methane*

The carbinol of Example III is treated in exactly the same manner as described in Example LX. The chloro derivative is a somewhat viscous pale yellow liquid boiling at 190–195° C./3-4 mm.

EXAMPLE LXII

*Phenyl-(2-pyridyl)-(N-methyl-4-piperidyl)methane methiodide*

This quaternary salt is prepared from the methane derivative of Example LX and methyl iodide in methyl alcohol, M. P. 202–203° C.

EXAMPLE LXIII

*Diphenyl-(N-ethyl-4-piperidyl)carbinol*

This compound is made by the procedure of Example XXV wherein methyl-N-ethylisonipecotate is reacted with phenyl magnesium bromide. The carbinol is obtained as a white, crystalline solid, which melts at 93–94° C.

EXAMPLE LXIV

*Diphenyl-(N-ethyl-3-piperidyl)carbinol*

From methyl-N-ethylnipecotate and phenyl magnesium bromide by the procedure of Example XXV. The compound is obtained as a white, crystalline solid melting at 102–103° C.

EXAMPLE LXV

*Diphenyl-(N-ethyl-3-piperidyl)carbinol hydrochloride*

Prepared from the compound of Example LXIV and anhydrous HCl, M. P. 216–217° C.

EXAMPLE LXVI

*Diphenyl-(N-methyl-2-piperidyl)carbinol*

From methyl-N-methylpipecolinate and phenyl magnesium bromide according to the procedure of Example XXV, M. P. 92–93° C.

EXAMPLE LXVII

*Diphenyl-(N-isopropyl-4-piperidyl)carbinol*

From methyl-N-isopropylisonipecotate and phenyl magnesium bromide by the procedure of Example XXV, M. P. 133–134° C.

EXAMPLE LXVIII

*Di-(p-methylphenyl)-(N-methyl-4-piperidyl)carbinol*

From methyl - N - methylisonipecotate and p - methylphenyl magnesium bromide by the procedure of Example XXV, M. P. 190–191° C.

EXAMPLE LXIX

*Diphenyl-(N-n-propyl-4-piperidyl)carbinol*

From methyl-N-propylisonipecotate and phenyl magnesium bromide by the procedure of Example XXV, M. P. 125–126° C.

EXAMPLE LXX

*Diphenyl-(N-isobutyl-4-piperidyl)carbinol*

From methyl-N-isobutylisonipecotate and phenyl magnesium bromide by the procedure of Example XXV, M. P. 136–137° C.

EXAMPLE LXXI

*Di-(p-methoxyphenyl)-(N-methyl-4-piperidyl)carbinol*

From methyl-N-methylisonipecotate and p-methoxyphenyl magnesium bromide by the procedure of Example XXV, M. P. 161–162° C.

EXAMPLE LXXII

*Di-(cyclohexyl)-(N-methyl-4-piperidyl)carbinol*

From methyl-N-methylisonipecotate and cyclohexyl magnesium bromide by the procedure of Example XXV, M. P. 126–127° C.

EXAMPLE LXXIII

*Phenyl-ethyl-(N-methyl-4-piperidyl)carbinol*

From the 4-benzoyl-N-methylpiperidine of Example I and ethyl magnesium bromide by the procedure of Example LIV, M. P. 108–109° C.

EXAMPLE LXXIV

*Phenyl-(m-chlorophenyl)-(N-methyl-4-piperidyl)-carbinol*

By the procedure of Example LXXIII substituting m-chlorophenyl magnesium bromide for ethyl magnesium bromide, M. P. 135–136° C.

EXAMPLE LXXV

*Phenyl-(p-methylphenyl)-(N-methyl-4-piperidyl)-carbinol*

By the procedure of Example LXXIII substituting p-methylphenyl magnesium bromide for ethyl magnesium bromide, M. P. 143–144° C.

EXAMPLE LXXVI

*Phenyl-(n-hexyl)-(N-methyl-4-piperidyl)carbinol*

By the procedure of Example LXXIII wherein n-hexyl magnesium bromide is substituted for ethyl magnesium bromide, B. P. 164–167° C. (1 mm.).

EXAMPLE LXXVII

*Phenyl-(n-butyl)-N-methyl-4-piperidyl(carbinol)*

By the procedure of Example LXXIII wherein n-butyl magnesium bromide is substituted for ethyl magnesium bromide, 140–145° C. (3 mm.).

EXAMPLE LXXVIII

*Phenylisobutyl-(N-methyl-4-piperidyl)carbinol*

By the procedure of Example LXXIII wherein isobutyl magnesium bromide is substituted for ethyl magnesium bromide, M. P. 112–113° C.

EXAMPLE LXXIX

*Phenyl-($\Delta^1$-cyclohexenyl)-(N-methyl-4-piperidyl)-carbinol*

By the procedure of Example LXXIII substituting $\Delta^1$-cyclohexenyl magnesium bromide for ethyl magnesium bromide, B. P. 176–182° C. (2 mm.); M. P. 104–105° C.

EXAMPLE LXXX

*Phenyl-(n-propyl)-(N-ethyl-4-piperidyl)carbinol*

The requisite intermediate, 4-benzoyl-N-ethylpiperidine, is prepared from N-ethylisonipecotic acid hydrochloride and benzene with aluminum chloride in accordance with the procedure of Example I. The resulting 4-benzoyl-N-ethylpiperidine is then treated with n-propyl magnesium bromide in accordance with the procedure of Example LXXIII. The resulting carbinol is a pale yellow liquid boiling at 144–147° C. (1 mm.).

EXAMPLE LXXXI

*Phenyl-(2-thienyl)-(N-ethyl-4-piperidyl)-carbinol*

By the procedure of Example LXXX wherein 2-thienyl magnesium bromide is substituted for the n-propyl magnesium bromide, B. P. 196–198° C. (2 mm.); M. P. 104–105° C.

EXAMPLE LXXXII

*Phenyl-(n-propyl)-(N-ethyl-3-piperidyl)carbinol*

By the procedure of Example LXXX wherein 3-benzoyl-N-methylpiperidine and n-propyl magnesium bromide is reacted. The carbinol is a smooth, viscous liquid boiling at 140–150° C. (2 mm.); M. P. 89–90° C.

EXAMPLE LXXXIII

*p-Chlorophenyl-(n-propyl)-(-N-methyl-4-piperidyl)-carbinol*

From 4-(p-chlorobenzoyl)-N-methylpiperidine and n-propyl magnesium bromide, M. P. 135–136° C.

EXAMPLE LXXXIV

*p-Methoxyphenyl-(n-propyl)-(N-methyl-4-piperidyl)-carbinol*

From 4-(p-methoxybenzoyl)-N-methylpiperidine and n-propyl magnesium bromide, B. P. 165–170° C. (2 mm.).

EXAMPLE LXXXV

*Phenyl-(n-propyl)-(N-isopropyl-4-piperidyl)carbinol*

From 4-benzoyl-N-isopropylpiperidine and n-propyl magnesium bromide, B. P. 143–153° C. (0.5 mm.).

EXAMPLE LXXXVI

*Diphenyl-(N-methyl-4-piperidylidene)methane methylsulfate*

From the compound of Example XVIII and an anion exchange resin in the sulfate form, M. P. 204–205° C.

EXAMPLE LXXXVII

*Diphenyl - (N - methyl - 4 - piperidylidene)methane benzylchloride*

From the compound of Example VI and benzylchloride in benzene, M. P. 158–159° C.

EXAMPLE LXXXVIII

*Phenyl-cyclohexyl-(N-methyl-4-piperidylidene)methane*

From the carbinol of Example XLII by the sulfuric acid procedure of Example VI, B. P. 155–164° C. (2 mm.).

EXAMPLE LXXXIX

*Phenyl - cyclohexyl - (N - methyl - 4 - piperidylidene) methane methiodide*

From the compound of the preceding example and methyl iodide, M. P. 192–193° C.

EXAMPLE XC

*Phenyl - (n - propyl) - (N - methyl - 4 - piperidylidene) methane citrate*

From the compound of Example LVI and citric acid, M. P. 144–145° C.

EXAMPLE XCI

*Phenyl-isobutyl-(N-methyl-4-piperidylidene)methane*

From the carbinol of Example LXXVIII by the sulfuric acid method of Example VI, B. P. 106–109° C. (1 mm.).

EXAMPLE XCII

*Phenyl - isobutyl - (N - methyl - 4 - piperidylidene) methane methiodide*

From the compound of Example XCI and methyl iodide, M. P. 153–154° C.

EXAMPLE XCIII

*Phenyl-(n-butyl)-(N-methyl-4-piperidylidene)methane*

From the carbinol of Example LXXVII by the sulfuric acid procedure of Example VI, B. P. 120–124° C. (1 mm.).

EXAMPLE XCIV

*Phenyl-(n-hexyl)-(N-methyl-4-piperidylidene)methane*

From the carbinol of Example LXXVI by the sulfuric acid method of Example VI, B. P. 145–148° C. (0.5 mm.).

EXAMPLE XCV

*Phenyl - (p - chlorophenyl) - (N,N - dimethyl - 4 - piperidylidene)methane methylsulfate*

From the compound of Example VIII and dimethyl sulfate in benzene, M. P. 157–158° C.

EXAMPLE XCVI

*Phenyl-ethyl-(N-methyl-4-piperidylidene)methane*

From the carbinol of Example LXXIII by the sulfuric acid method of Example VI, B. P. 109–111° C. (1.5 mm.).

EXAMPLE XCVII

*Phenyl-ethyl-(N-methyl-4-piperidylidene)methane citrate*

From the compound of the previous example and citric acid, M. P. 150–151° C.

EXAMPLE XCVIII

*Diphenyl - (N,N-dimethyl - 4 - piperidylidene)methane methylsulfate*

From the compound of Example VI and dimethyl sulfate in benzene, M. P. 196–197° C.

EXAMPLE XCIX

*Diphenyl - (N - ethyl - 4 - piperidylidene)methane hydrochloride*

Prepared from the compound of Example XXXI and anhydrous hydrochloride, M. P. 273–274° C.

EXAMPLE C

*Phenyl-(n-propyl)-(N-ethyl-4-piperidylidene)methane*

From the carbinol of Example LXXX by the sulfuric acid procedure of Example VI, B. P. 116–123° C. (5 mm.).

EXAMPLE CI

*Phenyl - (n - propyl) - (N - ethyl - 4 - piperidylidene) methane citrate*

From the compound of the previous example and citric acid, M. P. 113–114° C.

EXAMPLE CII

*Phenyl - (2 - thienyl) - (N - methyl - 4 - piperidylidene) methane citrate*

From the compound of Example XLV and citric acid, M. P. 154–155° C.

EXAMPLE CIII

*Phenyl - (2 - thienyl) - (N,N - dimethyl - 4 - piperidylidene)methane methylsulfate*

From the compound of Example XLV and dimethyl sulfate in benzene, M. P. 178–179° C.

EXAMPLE CIV

*p - Chlorophenyl - (n - propyl) - (N - methyl - 4 - piperidylidene)methane*

From the carbinol of Example LXXXIII by the sulfuric acid procedure of Example VI, B. P. 130–139° C. (1 mm.).

EXAMPLE CV

*p - Chlorophenyl - (n - propyl) - (N - methyl - 4 - piperidylidene)methane citrate*

From the compound of the previous example and citric acid, M. P. 142–143° C.

EXAMPLE CVI

*Phenyl-(2-thienyl)-(N-ethyl-4-piperidylidene)methane*

From the carbinol of Example LXXXI by the sulfuric acid procedure of Example VI, B. P. 174–176° C. (3 mm.).

EXAMPLE CVII

*Phenyl - (2 - thienyl) - (N-methyl - N - ethyl - 4 - piperidylidene)methane methylsulfate*

From the free base of Example CVI and dimethyl sulfate in benzene, M. P. 190–191° C.

EXAMPLE CVIII

*Phenyl - (2 - thienyl) - (N-ethyl - 4 - piperidylidene) methane-citrate*

From the compound of Example CVI and citric acid, M. P. 148–149° C.

EXAMPLE CIX

*Di - (p - methoxyphenyl) - (N,N-Dimethyl - 4 - piperidylidene)methane methylsulfate*

Dehydration of the carbinol of Example LXXI by the sulfuric acid procedure of Example VI gives the piperidylidene compound in crude form. It was converted directly into the quaternary salt with dimethyl sulfate in benzene solution. The salt melts at 178–179° C.

EXAMPLE CX

*Di - (p - methoxyphenyl) - (N - methyl - 4 - piperidylidene)methane citrate*

From the crude unsaturated base of the previous example and citric acid, M. P. 145–146° C.

EXAMPLE CXI

*Diphenyl - (N - methyl - 3 - piperidylidene)methane hydrochloride*

From the free base of Example XXVI and anhydrous HCl, M. P. 254–255° C.

EXAMPLE CXII

*Phenyl - (n - butyl) - (N - methyl - 4 - piperidylidene) methane citrate*

From the free base of Example XCIII and citric acid, M. P. 149–150° C.

EXAMPLE CXIII

*Diphenyl-(N-methyl-4-piperidylidene)methane hydrobromide*

From the free base of Example VI and hydrobromide M. P. 277–278° C.

EXAMPLE CXIV

*p - Hydroxyphenyl-phenyl-(N-methyl-4-piperidylidene)-methane hydrochloride*

From the free base of Example XVII after demethylation with hydrobromide and acetic acid, regeneration of the p-hydroxyphenylpiperidylidene compound in ether solution, followed by the addition of anhydrous HCl, M. P. 266–267° C.

EXAMPLE CXV

*Phenyl-p-hydroxyphenyl-(N,N-dimethyl - 4 - piperidylidene)-methane methylsulfate*

From the crude p-hydroxyphenylpiperidylidene compound of the previous example and dimethyl sulfate in benzene, M. P. 190–191° C.

EXAMPLE CXVI

*Diphenyl-(N-methyl-2-piperidylidene)methane*

From the carbinol of Example LXVI by the sulfuric acid procedure of Example VI, B. P. 155–160° C. (2 mm.).

EXAMPLE CXVII

*Diphenyl-(N-methyl - 2 - piperidylidene)methane methiodide*

From the compound of the previous example and methyl iodide, M. P. 193–194° C.

EXAMPLE CXVIII

*Diphenyl - (N - ethyl - 3 - piperidylidene) methane*

From the carbinol of Example LXIV by the sulfuric acid method of Example VI, B. P. 164–168° C. (1 mm.); M. P. 84–85° C.

EXAMPLE CXIX

*Diphenyl - (N - methyl - 4 - piperidylidene)methane isopropyliodide*

From the free base of Example VI and isopropyl iodide, M. P. 243–244° C.

EXAMPLE CXX

*Diphenyl-(N-isopropyl-4-piperidylidene)methane*

From the carbinol of Example LXVII by the sulfuric acid method of Example VI, B. P. 157–165° C. (1 mm.).

EXAMPLE CXXI

*Phenyl - (n-propyl) - (N-ethyl - 3 - piperidylidene)-methane*

From the carbinol of Example LXXXII by the sulfuric acid method of Example VI, B. P. 127–131° C. (1 mm.).

EXAMPLE CXXII

*Diphenyl-(N-isopropyl - N-methyl - 4 - piperidylidene)-methane methylsulfate*

From the free base of Example CXX and dimethyl sulfate, M. P. 189–190° C.

EXAMPLE CXXIII

*Diphenyl-(N-isopropyl - 4 - piperidylidene)methane isopropyliodide*

From the free base of Example CXX and isopropyliodide, M. P. 232–233° C.

EXAMPLE CXXIV

*Di - (p-methylphenyl) - (N-methyl - 4 - piperidylidene) methane*

From the carbinol of Example LXVIII by the sulfuric acid procedure of Example VI, B. P. 185–188° C. (2 mm.); M. P. 110–111° C.

EXAMPLE CXXV

*Di- (p - methylphenyl) - (N,N - dimethyl - 4 - piperidylidene)methane methylsulfate*

From the free base of the previous example and dimethyl sulfate, M. P. 170–171° C.

EXAMPLE CXXVI

*Phenyl - (p - methylphenyl) - (N - methyl - 4 - piperidylidene)methane*

From the carbinol of Example LXXV by the sulfuric acid method of Example VI, B. P. 173–180° C. (2 mm.).

EXAMPLE CXXVII

*Phenyl - ($\Delta^1$ - cyclohexenyl) - (N - methyl - 4 - piperidylidene)methane*

From the carbinol of Example LXXIX and sulfuric acid procedure of Example VI, B. P. 162–168° C. (2 mm.).

EXAMPLE CXXVIII

*Phenyl - (o - methoxyphenyl) - (N - methyl - 4 - piperidylidene)methane*

By the conventional Grignard reaction on 4-benzoyl-N-methylpiperidine and o-methoxyphenyl magnesium bromide and subsequent dehydration of the tertiary carbinol by the sulfuric acid method of Example VI, B. P. 180–187° C. (2 mm.).

EXAMPLE CXXIX

*Phenyl - (p - methylphenyl) - (N - methyl - 4 - piperidylidene)methane methiodide*

From the free base of Example CXXVI and methyl iodide, M. P. 215–216° C.

EXAMPLE CXXX

*Phenyl - (n - propyl) - (N - isopropyl - 4 - piperidylidene)methane*

From the carbinol of Example LXXXV by the sulfuric acid procedure of Example VI, B. P. 118–125° C. (1 mm.).

EXAMPLE CXXXI

*Phenyl - (n - propyl) - (N - isopropyl - 4 - piperidylidene)-methane citrate*

From the compound of the previous example and citric acid, M. P. 141–142° C.

EXAMPLE CXXXII

*Phenyl - (m - chlorophenyl) - (N - methyl - 4 - piperidylidene)methane*

From the carbinol of Example LXXIV by the sulfuric acid method of Example VI, B. P. 166–170° C. (0.5 mm.).

EXAMPLE CXXXIII

*Phenyl - (m - chlorophenyl) - (N - methyl - 4 - piperidylidene)methane methiodide*

From the free base of the previous example and methyl iodide, M. P. 200–201° C.

EXAMPLE CXXXIV

*Diphenyl - (N - n - propyl - 4 - piperidylidene)methane*

From the carbinol of Example LXIX by the sulfuric acid method of Example VI, B. P. 164–167° C. (2 mm.).

The following are typical of other compounds of the invention which may be made by the reactions and procedures described herein:

Phenyl-(2-thiazyl)-(N-methyl-4-piperidyl)carbinol
Phenyl-(2-thiazyl)-(N-methyl-3-piperidyl)carbinol
Di-(2-thiazyl)-(N-methyl-4-piperidyl)carbinol
Di-(2-thiazyl)-(N-methyl-3-piperidyl)carbinol
Phenyl-(2-pyrimidyl)-(N-methyl-4-piperidyl)carbinol
Phenyl-(2-pyrimidyl)-(N-methyl-3-piperidyl)carbinol
Di-(2-pyrimidyl)-(N-methyl-4-piperidyl)carbinol
Di-(2-pyrimidyl)-(N-methyl-3-piperidyl)carbinol
Di-(2-pyridyl)-(N-methyl-4-piperidyl)carbinol
Di-(2-pyridyl)-(N-methyl-3-piperidyl)carbinol
Di-(2-thienyl)-(N-methyl-3-piperidyl)carbinol
Phenyl - (2 - thiazyl) - N-methyl - 4 - piperidylidene) - methane
Phenyl - (2 - thiazyl) - (N-methyl - 3 - piperidylidene) - methane
Di-(2-pyrimidyl)-(N-methyl-4-piperidylidene)methane
Di-(2-pyrimidyl)-(N-methyl-3-piperidylidene)methane
Di-(2-pyridyl)-(N-methyl-4-piperidylidene)methane
Di-(2-pyridyl)-(N-methyl-3-piperidylidene)methane
Di-(2-thienyl)-(N-methyl-4-piperidylidene)methane
Di-(2-thienyl)-(N-methyl-3-piperidylidene)methane
Di-(2-thiazyl)-(N-methyl-4-piperidylidene)methane
Di-(2-thiazyl)-(N-methyl-3-piperidylidene)methane
Phenyl - (2 - pyrimidyl) - (N - methyl - 4 - piperidylidene)methane
Phenyl - (2 - pyrimidyl) - (N - methyl - 3 - piperidylidene)methane
Phenyl-(2-thiazyl)-(N-methyl-3-piperidyl)methane
Di-(2-thiazyl)-(N-methyl-4-piperidyl)methane
Di-(2-thiazyl)-(N-methyl-3-piperidyl)methane
Phenyl-(2-pyrimidyl)-(N-methyl-4-piperidyl)methane
Phenyl-(2-pyrimidyl)-(N-methyl-3-piperidyl)methane
Di-(2-pyrimidyl)-(N-methyl-4-piperidyl)methane
Di-(2-pyrimidyl)-(N-methyl-3-piperidyl)methane
Di-(2-pyridyl)-(N-methyl-4-piperidyl)methane
Di-(2-pyridyl)-(N-methyl-3-piperidyl)methane
Di-(2-thienyl)-(N-methyl-4-piperidyl)methane
Di-(2-thienyl)-(N-methyl-3-piperidyl)methane
Phenyl-n-propyl-(N-methyl-3-piperidyl)carbinol
Phenyl-n-propyl-(N-methyl-3-piperidylidene)methane
2,4-Dimethyl-(N-methyl-4-piperidylidene)pentane
Phenyl-n-amyl-(N-methyl-4-piperidyl)carbinol
Phenyl-n-amyl-(N-methyl-4-piperidylidene)methane This application is a continuation-in-part of our application Serial No. 199,364, filed December 5, 1950, and now abandoned.

We claim:

1. Substituted piperidylidenes of the group consisting of piperidylidenes of the formula

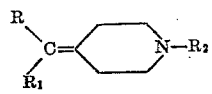

wherein R and $R_1$ are members of the group consisting of phenyl, lower alkyl, lower alkoxy, hydroxy and halogen substituted phenyl, lower alkyl, benzyl, cyclohexyl, cyclohexenyl, pyridyl, thienyl and thiazyl, and $R_2$ is a lower alkyl group, and the lower alkyl and benzyl quaternary salts and acid addition salts thereof.

2. Piperidylidene compounds selected from the group consisting of the base of the general formula

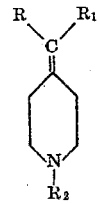

wherein R and $R_1$ are selected from the class consisting of phenyl, mono-halophenyl, and pyridyl, and $R_2$ is a lower alkyl group, and the lower alkyl quaternary salts and acid addition salts thereof.

3. Piperidylidene compounds of the general formula

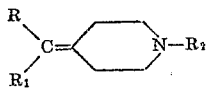

wherein R is p-chlorophenyl, $R_1$ is 2-pyridyl and $R_2$ is lower alkyl.

4. Lower alkyl quaternary salts of piperidylidene compounds of the general formula

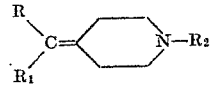

wherein R and $R_1$ are phenyl and $R_2$ is a lower alkyl group.

5. Piperidylidene compounds of the general formula

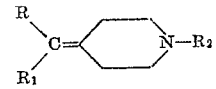

wherein R is phenyl and $R_1$ and $R_2$ are lower alkyl groups.

6. Phenyl - (2 - thienyl) - (N - methyl - 4 - piperidylidine)methane.

7. Lower alkyl quaternary salts of phenyl-(n-propyl)-(N-methyl-4-piperidylidene)-methane.

8. Diphenyl-(N,N-dimethyl-4-piperidylidene)-methane methylsulfate.

9. Phenyl - (n - propyl) - (N - methyl - 4 - piperidylidene)-methane citrate.

10. (p - Chlorophenyl) - (2 - pyridyl) - (N - methyl - 4-piperidylidene)methane.

References Cited in the file of this patent

UNITED STATES PATENTS

| | | |
|---|---|---|
| 2,446,522 | Bockmuhl | Aug. 10, 1948 |
| 2,599,364 | Berger et al. | June 3, 1952 |
| 2,599,365 | Berger | June 3, 1952 |